UNITED STATES PATENT OFFICE.

JOHN RINGEN, OF ST. LOUIS, MISSOURI.

WASHER.

SPECIFICATION forming part of Letters Patent No. 271,275, dated January 30, 1883.

Application filed December 11, 1882. (No model.)

*To all whom it may concern:*

Be it known that I, JOHN RINGEN, of St. Louis, Missouri, have made a new and useful Improvement in Washers, of which the following is a full, clear, and exact description.

The aim of this invention is twofold—to provide a washer sufficiently resilient to operate to lock the bolt to which it is applied and prevent it from loosening and turning, and also a washer that will withstand heat.

The improved washer is of the ordinary shape or shapes, but is composed of asbestus. The fiber of this material, when disintegrated and then matted together, as in the form of asbestus cloth, and in which form the asbestus is used to advantage in making the present washer, is analogous to felt, being yielding and elastic, and suited for fastening a bolt. At the same time its refractory nature enables the washer to be used in constructions exposed to a high degree of heat.

The improved washer is designed more especially for stove-bolts; but it can be employed many times in constructions other than stoves.

I claim—

As a new manufacture, an asbestus washer.

JOHN RINGEN.

Witnesses:
C. D. MOODY,
SAML. S. BOYD.